United States Patent Office 3,570,189
Patented Mar. 16, 1971

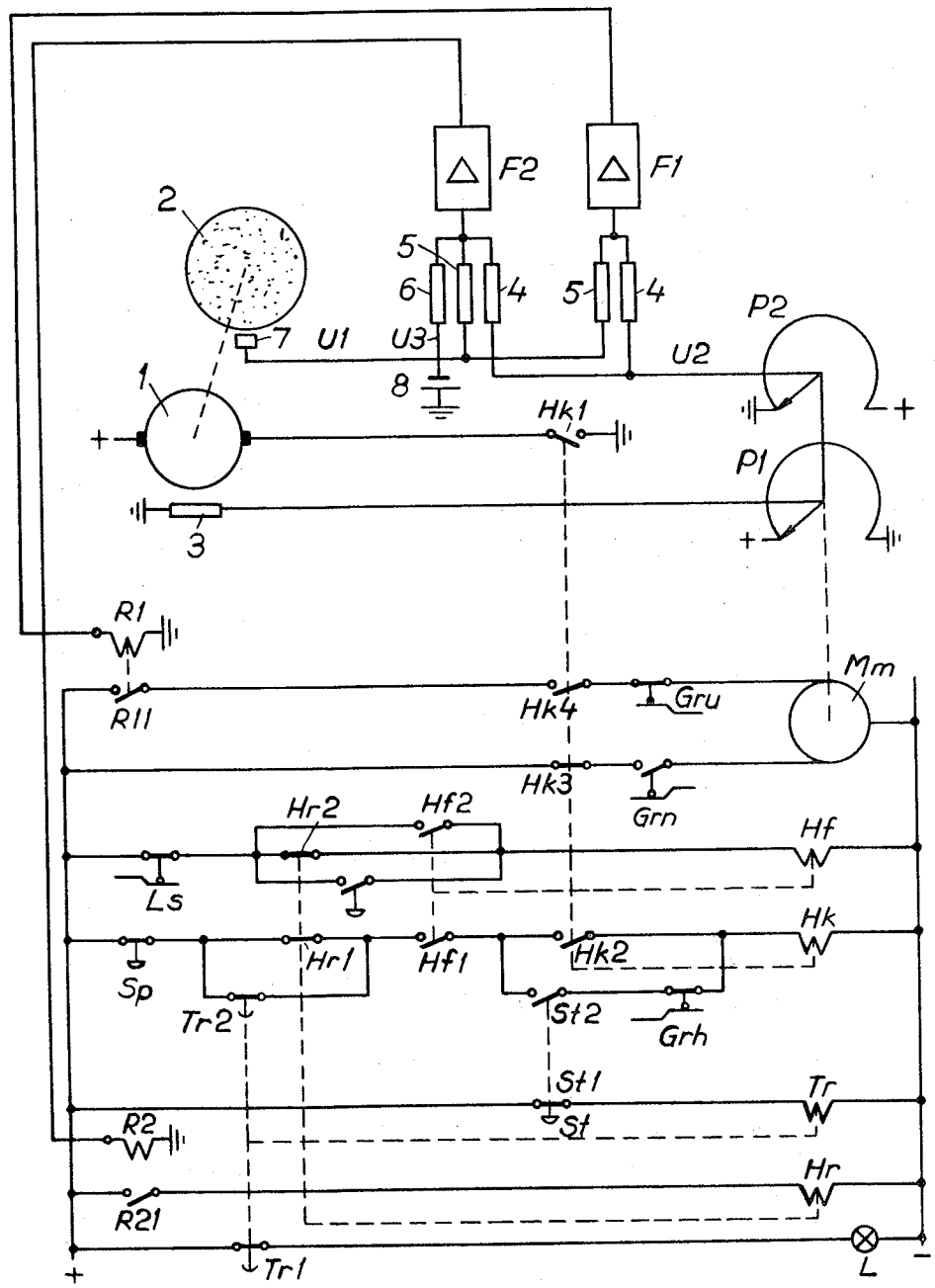

3,570,189
CONTROL ARRANGEMENT FOR GRINDING
MACHINES FOR PREVENTING OPERATION
UNDER DANGEROUS CONDITIONS
Olle Keding and Per-Ola Fahlman, Vasteras, Sweden, assignors to Allmänna Svenska Elektriska Aktiebolaget, Vasteras, Sweden
Filed May 1, 1968, Ser. No. 725,870
Claims priority, application Sweden, May 5, 1967, 6,336/67
Int. Cl. B24b 5/00
U.S. Cl. 51—134.5
5 Claims

ABSTRACT OF THE DISCLOSURE

In a protective device for a grinding machine having a motor driving a grinding wheel, the speed of rotation of the grinding wheel is maintained substantially inversely proportional by a relay which is responsive to the difference between two signals which vary with the diameter and speed respectively. A second relay is furnished additionally with a constant signal and opens a switch in the circuit to the motor when the difference between the first two signals is greater than the third signal. A time-delay relay is provided which, when the motor starter button is operated, bypasses this switch for a long enough time to allow the motor to come up to minimum speed.

BACKGROUND OF THE INVENTION (1) Field of the invention

The invention relates to a safety device for preventing operation of a grinding machine under dangerous conditions.

(2) The prior art

In order to obtain maximum performance from a grinding machine the speed of rotation of the grinding disc should be variable so that its peripheral speed is as constant as possible and as high as its mechanical strength will permit. For this purpose a transducer is placed beside the grinding disc to emit a signal dependent on the diameter of the grinding disc. A second transducer generates a signal dependent on the rotary speed of the grinding disc and these two signals are combined in a control device which emits a control signal to an operating device for the driving motor when the difference between the two signals exceeds a predetermined value. The operating device accelerates the speed of the driving motor so that the difference between the two signals becomes zero.

The grinding disc is provided at least on one side with an earthed conducting layer which cooperates with the first-mentioned transducer. If this layer should be damaged during the grinding, the first-mentioned transducer will emit a faulty signal which, under unfortunate circumstances, may cause the grinding disc to rotate so fast that it may break.

The grinding disc is inserted in a protective covering which has a gap enabling replacement and inspection of the grinding disc. The gap has an interlocking contact which is included in the operating circuit of the driving motor and which prevents the driving motor from starting when the gap is open. If the disc is inserted incorrectly by mistake, so that the electrically conducting layer is not on the same side as the transducer, the transducer will emit a signal as if there were no disc inserted and the driving motor will accelerate to maximum speed. There is then considerable risk of the disc being damaged.

SUMMARY OF THE INVENTION

The above-mentioned risks are avoided by means of the present invention. The invention relates to a device for grinding machines with rotating grinding discs, where the driving motor of the gripping machine is regulated so that the rotary speed of the grinding disc is substantially inversely proportional to its diameter and where the grinding machine is provided with a first transducer which emits a signal which is dependent on the diameter of the grinding disc and a second transducer which emits a signal dependent on the speed of the grinding disc, which two signals are supplied to a control device which controls the driving motor of the grinding machine. The invention is characterised in that a blocking device which is supplied with said two signals and a third constant signal is arranged to influence a contact connected in the current circuit of the driving motor in order to break said circuit when the difference between said first two signals is at least as great as the third signal. Furthermore, a time device is arranged to by-pass said contact when the grinding machine starts for a time as long as the driving motor of the grinding machine requires for accelerating the grinding disc to the speed corresponding to the minimum permitted diameter of the grinding disc.

BRIEF DESCRIPTION OF THE DRAWING

The accompanying drawing shows in its upper part how the transducers are arranged and how the transducer signals are supplied to the control device and blocking device, while the bottom part of the figure shows a connection diagram for the main relay circuits.

DESCRIPTION OF THE PREFERRED EMBODIMENTS

In the drawing the driving motor of the grinding machine is designated 1 and the grinding disc 2. The current to the driving motor is disconnected and connected by means of a contact H$k$1. The speed of the driving motor is regulated by means of the excitation current through the field winding 3 of the motor, across a potentiometer P1 which is set by means of the motor operating device M$m$. A second potentiometer P2, driven synchronously with the potentiometer P1, emits a signal U2 which is proportional to the speed of the driving motor 1. This signal is supplied over the resistor 4 to the two amplifiers F1 and F2.

A transducer 7 is arranged beside the grinding disc 2. The transducer is of a type known per se and comprises two electrode systems, one of which operates as emitter and the other as receiver. An earthed layer covering the grinding disc acts as a screen between the two systems and the radius of the layer will thus determine the degree of connection between the two electrode systems and thus also the magnitude of the signal emitted. The more worn the disc is, the smaller will be the screen effect and the greater the connection and thus also the output signal. The transducer signal U1 is supplied to the amplifiers F1 and F2 over the resistor 5. The amplifier F2 is also supplied with a third signal U3 from a voltage source 8. The output of the amplifier F1 is connected to a relay R1 and in the same way the output of the amplifier F2 is connected to a relay R2.

The amplifier F1 is adjusted so that if the difference between U1 and U2 exceeds a certain value, for example 0.1 v., the relay R1 switches and starts the motor operating device M$m$. The potentiometers P1 and P2 are changed in such a direction that the speed of the driving motor 1 increases and the signal U2 increases. When U1 and U2 become equal, the relay R1 drops and the motor operating device stops. The amplifier F2 is set so that it influences the relay R2 only when the difference between U1 and U2 is greater than U3, whereby U3 is considerably greater switches on.

The grinding disc is surrounded by a protective covering which is provided with a gap to be opened when the grinding disc is replaced. The gap is provided with a switch Ls which maintains the circuit for an interlocking auxiliary relay Hf open as long as the gap is not closed. The auxiliary relay Hf has a holding contact Hf2 in its circuit. When the gap is opened, Hf drops and the holding contact Hf2 breaks the holding circuit so that under certain circumstances the relay remains in off-position even if the gap is closed and Ls is closed.

In the drawing are shown those parts of the relay diagram of the grinding machine which are necessary in order to understand the function of the protection means. The connection is shown in currentless position with the motor operating device Mm in rest position, that is the driving motor is set for its lowest speed. When the relay connection is placed under voltage a time delay relay Tr switches on. The relay has two breaking contacts Tr1 and Tr2. So that the machine can start an auxiliary relay Hr must be voltageless, that is the breaking contact Hr2 must be closed so that the current circuit for the auxiliary relay Hf is closed. If the previously mentioned gap to the protective covering is open, the gap switch Ls is also open and the auxiliary relay Hf receives no voltage. When the gap is closed and the contact Hr2 closed, the auxiliary relay Hf switches on and controls its contact Hf2. Another contact Hf1 also switches on. The grinding machine can now be started by pressing the starting button St so that its contact St2 closes to furnish current to the driving motor 1 by closing switch Hk1 through energization of relay Hk so that the grinding machine starts. When the starting button is pressed its contact St1 is broken and the time lag relay Tr becomes currentless so that its two contacts Tr1 and Tr2 return to the position shown in the drawing. A condition for the machine to be able to start is that the motor operating device is in rest position so that a limit position switch Grh is closed.

The previously mentioned relay R2 has a contact R21 in the circuit of the auxiliary relay Hr. The relay has two contacts Hr1 and Hr2. The first one of these is included in the circuit to the main contact Hk and the second, Hr2 is in the circuit for the auxiliary relay Hf.

The process now described assumes that a new and perfect grinding disc is inserted. The motor operating device is in its rest position that is set for the lowest speed of the driving motor. U1 is then equal to U2 and none of the relay switches on. When Hk switches on, its contact Hk4 is closed and the contact Hk3 is opened. The contact Hk4 is connected in one of the feeding conduits for the motor operating device Mm together with a limit position switch for controlling Gru which normally is closed but opens and breaks the current circuit when the motor operating device has reached its highest position, that is when the driving motor has reached its highest speed. In the other feeding conduit is a limit position switch Grn which breaks when the motor operating device has reached its lowest position, rest position. When the main contact Hk drops the contact Hk3 closes and the motor operating device takes up its rest position and presets the lowest speed of the driving motor for the next start.

If during the starting process, when the relay connection is under voltage, a disc without a covering layer is inserted in the machine the voltage U1 is greater than $U2+U3$, which means that the relay R2 switches on. The auxiliary relay Hr receives voltage and its two contacts Hr1 and Hr2 break. The auxliiary relay Hf cannot switch on, that is, the driving motor is unable to start.

The machine can be started only if a new disc with a covering layer is inserted or if a responsible person decides that grinding is to take place even if the disc does not fulfill these requirements and thus gives an impulse to the relay Hf with the lockable press button T. When the machine is to be stopped, the stop-button Sp is pressed, whereby the circuit to Hk is broken and all its contacts fall. The contact Hk3 closes the circuit for the return of the motor operating device, which moves to its rest position. The auxiliary relay Hf is closed. For a re-start the start button is pressed. It is assumed that the disc is not completely worn out. The signal U1 is greater than $U2+U3$, which means that the relays R1 and R2 switch on. The time lag delay relay Tr which received current when the starting button was released is closed and its contact Tr2 keeps the contact Hr1 by-pass connected. As long as R21 is closed, the contact Hr1 is open and in order that the machine can be started the interruption of the circuit produced by relay R2 must be rendered ineffective until the speed of the grinding disc is so high that $U2+U3=U1$, when R21 opens. During the time when the function of R2 is by-passed the warning light L shines. It is switched on when the contact Hr3 closes in series with the time lag relay contact Tr1.

If the layer on the grinding disc should be damaged during grinding the signal U1 increases rapidly and tries to effect an increase in the speed. If the damage is so great that $U1>U2+U3$ the relay R2 switches on. The auxiliary relay Hr also switches on and its contacts Hr1 and Hr2 break. This causes Hk to switch on and the motor 1 stops. The relay R2 prevents a disc which has been damaged during operation from being driven with too high speed. Such damage would otherwise perhaps be unnoticed by the person operating the machine and without the relay protection the disc might be broken and cause damage.

With a device according to the invention, therefore, the motor is prevented from starting with a faulty or worn disc and continued operation with a damaged disc is prevented during operation.

We claim:

1. Protective device for a grinding machine with a rotating grinding disc, having a driving motor and means responsive to the rotary speed of the grinding disc to regulate the motor to maintain its speed substantially inversely proportional to the diameter of the grinding disc, comprising transducer means (7) which emits a signal which is dependent on the diameter of the grinding disc and a second means which emits a signal dependent on the speed of the grinding disc, a control device (F1) which controls the driving motor of the grinding machine, and means to furnish signals from both said signal emitting means to said control device characterized in a blocking device (F2) which is supplied with said two signals (U1, U2) and a third constant signal (U3), a contact (Hr1) connected in the current circuit of the driving motor, means operatively connecting said blocking device to said contact to break said circuit when the difference between said first two signals (U1, U2) is at least as great as the third signal (U3), and a time delay device (Tr) for bypassing said contact (Hr1) when the grinding machine starts for a time as long as the driving motor of the grinding machine requires for accelerating the grinding disc to the speed corresponding to the minimum permitted diameter of the grinding disc.

2. Means according to claim 1, characterized in a relay (R2) to which the output of the blocking device (F2) is connected, said relay (R2) having a make contact (R21), an auxiliary relay (Hr) having two contacts (Hr1, Hr2), one of which (Hr1) is included in the current circuit of the main contacts (Hk) of the grinding motor, while the other contact (Hr2) is included in the current circuit of an inter-locking auxiliary relay (Hf), said make contact being in the current circuit of said auxiliary relay.

3. Device according to claim 2, characterized in a second interlocking auxiliary relay (Hf), and a lockable pushbutton (T) in the supply circuit of said auxiliary relay interlocking in parallel to the second contact (Hr2) of the first auxiliary relay (Hr) and a self-holding contact (Hf2) of said second interlocking auxiliary relay.

4. Device according to claim 1, characterized in that said time delay device includes a time delay relay (Tr) having two break contacts (Tr1, Tr2) which open after a certain adjustable time, a signal lamp, one of the contacts (Tr1) being included in the current circuit of said signal lamp (L) and the other (Tr2) being arranged parallel to the first-mentioned contact (Hr1) of the auxiliary relay (Hr).

5. Protective device for a grinding machine having a motor and a grinding disc driven thereby, and having means responsive to the changes in the diameter of the disc to regulate the speed of the motor to maintain the rotary speed of the disc substantially inversely proportional to its diameter, said diameter responsive means including first signal emitting means to emit a signal which varies with variations in said diameter, and second signal emitting means to emit a signal which varies with variations in the speed of rotation of the disc, a motor control device for said motor and means to transmit signals from both said signal emitting means to said motor control device, third signal emitting means to emit a signal of constant value, means connected to said three signal emitting means to stop operation of said motor when difference between the signals from said first and second signal emitting means is at least as great as the signal from said third signal emitting means, starting means for said motor, and time delay means operative in response to said starting means for rendering said operation stopping means ineffective during starting of the motor.

References Cited
UNITED STATES PATENTS 3,113,405  12/1963  Schneider _____ 51—134.5

HAROLD D. WHITEHEAD, Primary Examiner